United States Patent [19]

Scruggs

[11] 4,204,142

[45] May 20, 1980

[54] HOIST MOTOR CONTROL SYSTEM

[76] Inventor: David M. Scruggs, 27587 Brookside La., San Juan Capistrano, Calif. 92675

[21] Appl. No.: 864,371

[22] Filed: Dec. 27, 1977

[51] Int. Cl.² ............ H02K 11/00

[52] U.S. Cl. ............ 318/257; 200/50 C

[58] Field of Search ............ 200/5 B, 50 C; 318/255-258, 268, 269, 342, 344, 347, 245

[56] References Cited

U.S. PATENT DOCUMENTS

| | | | |
|---|---|---|---|
| 2,899,619 | 8/1959 | Wiedemann | 318/344 X |
| 3,248,629 | 4/1966 | Reynolds | 318/257 |
| 3,422,296 | 1/1969 | Frank | 200/50 C X |
| 3,469,164 | 9/1969 | Truemper et al. | 318/257 |
| 3,703,646 | 11/1972 | Jacyno | 200/50 C |
| 3,755,725 | 8/1973 | Cordes | 318/257 |

*Primary Examiner*—J. V. Truhe
*Assistant Examiner*—W. E. Duncanson, Jr.
*Attorney, Agent, or Firm*—Brown & Martin

[57] ABSTRACT

An improved hoist control system wherein a D.C. motor is employed to drive the hoist, and a remote hand-held control is utilized to vary the motor speed and direction of rotation. The hand control comprises an A.C. to D.C. variable transformer which is controllable by a trigger mechanism, a three-pole double throw switch for up-off-down control of the motor, circuit on-off switches, a meter for reading the hoist load, and an interlock device for limiting the actuation of the motor control switch if the trigger is depressed.

4 Claims, 9 Drawing Figures

HOIST MOTOR CONTROL SYSTEM

BACKGROUND OF THE INVENTION

Modern hoists utilize on-off switches for motor control, and as the payload reaches a desired position the switch is actuated on and off in quick sequence to gradually jockey the payload into position. Because of the high current loads during motor starting, thermal circuit protection devices must be sized for two to four times the steady state motor load. Thus, the motor circuits must be sized to accommodate current levels several times greater than operating levels.

Additionally, prudent design dictates that the mechanical components must be sized to withstand the large motor torque produced at the high current level attainable before circuit interruption by the thermal protection device.

One approach to solving the problem has been to employ time-delay circuit breakers or fuses that allow high current levels to flow for a period only slightly longer than that required for motor starting before circuit interruption. However, many motor starts in a short time period, such as when jockeying a payload, can cause a thermal build up sufficient to trip the thermal protection device. In addition, this jockeying of the payload imposes heavy loads on the mechanical components of the hoist as well as the payload itself.

Mechanical protection devices such as slipping clutches or shear pins are not usually satisfactory for use in hoists, since such devices cause impaired or lost control of the payload. Such impaired control may allow rapid dropping of the payload which would be extremely dangerous to nearby personnel and the payload as well.

Thus, difficulties have continued to exist in providing efficient and safe control devices for hoists and other similarly loaded mechanisms.

SUMMARY OF THE INVENTION

The present invention relates generally to motor control devices and the preferred embodiment is drawn more particularly to a hoist motor control device. The system provides the hoist operator with the capability of controlling hoist motor speed proportionally to the depression of a trigger contained in a hand control.

The hand control is shaped for conveniently holding in either hand and provides the operator easy access to a three way switch to turn the motor off or to set the motor in an up or down mode. In a like manner the operator has at his finger tips the control knob of the thermal protection circuit breaker.

Additionally, there is mounted within the hand control a payload meter which visually indicates the force imposed on the payload. This visual cue assists the operator in manually depressing the trigger by giving a visual feedback of trigger position. By visually observing the payload and the payload meter and manually controlling the hand control trigger, the operator becomes very adept at precisely positioning the payload without resorting to the normal on-off jockeying of the payload.

In addition to the smooth control of the hoist motor provided by the trigger there is provided an interlock device that also prevents abrupt changes in the motor rotation. This interlock requires that the trigger be fully extended, which shuts off power to the motor, before the motor control control switch may be actuated to reverse the direction of motor rotation. Full extension of the trigger shuts off current to the motor either by an "off" position in the windings of a variable transformer, or if the transformer is configured to have a prescribed initial current, the circuit is turned off by a trigger actuated switch in series with the transformer.

The motor fitted within the hoist is a D.C. motor such as permanent magnet or shunt wound motor which runs essentially at the same torque from zero speed to full speed and produces a speed proportional to the armature current. Because the motor requires low starting current, the thermal protection device may be sized to interrupt the current upon a current overload on the order of 25%, which greatly reduces the maximum torque loads imposed on the mechanical components. This feature of the hoist operation together with the speed control feature provided by the trigger and the visual feedback of the meter permitting a desired position to be approached smoothly, rather than jockeying the payload, reduces the impact loads to the system by a factor of approximately three over conventional on-off A.C. motor hoists.

Thus it may be seen that the present invention yields an improved control system that requires less electrical power and reduces mechanical loads, resulting in an extended life of various components exceeding that of present day hoists by a factor of three, while at the same time providing the operator with an ability to more precisely position the hoist payload. This is accomplished by a new and improved control system which will hereinafter be described in greater detail.

BRIEF DESCRIPTION OF THE DRAWINGS

The advantages of the present invention reside in the construction and cooperation of the various elements as hereinafter described, reference being made to the preferred embodiment of the invention, wherein.

DETAILED DESCRIPTION OF THE INVENTION

Figure 1:
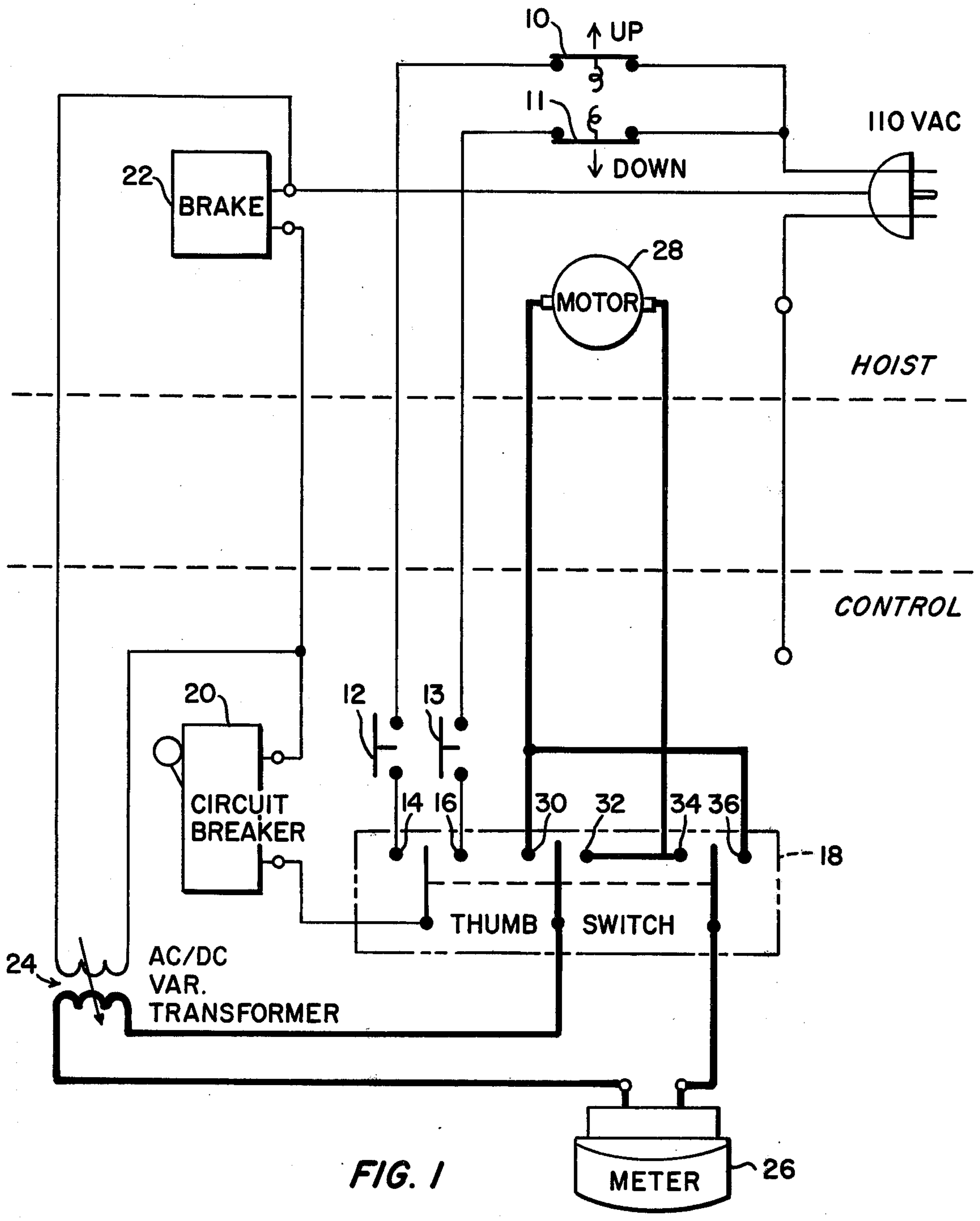
FIG. 1 is an electrical schematic of the hoist and hoist control system.

Referring now to the drawings in detail, FIG. 1 is a schematic illustration of the electrical system. It will be seen that incoming A.C. power passes through the limit switches 10 and 11, the circuit switches 12 and 13, and by means of contact 14 or 16 of the thumb switch 18, which is a three pole switch, to the circuit breaker 20. From the circuit breaker 20 current flows to hoist brake 22, releasing the brake, and to the A.C./D.C. variable transformer 24. From the variable transformer 24, D.C. current flows to the meter 26 and the hoist motor 28 by means of either contacts 30 and 34 or contacts 32 and 36 of thumb switch 18. It will be noted that the D.C. circuit is shown by heavier lines than the A.C. circuit for clarity.

The hoist limit switches 10 and 11 are normally closed, switch 10 being mechanically opened only when the hoist arrives at the full up position, and switch 11 being mechanically opened only when the hoist arrives at the full down position. Circuit switches 12 and 13 are normally open and are closed by initial movement of the hand control trigger. The transformer 24 is likewise controlled by the hand control trigger, such that effective voltage to hoist motor 28 increases proportionally to trigger depression.

Figure 3:
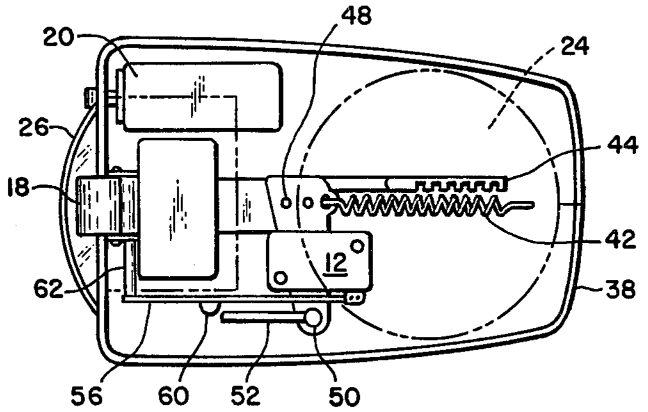
FIG. 3 is a top view of the hand control.
Figure 2:
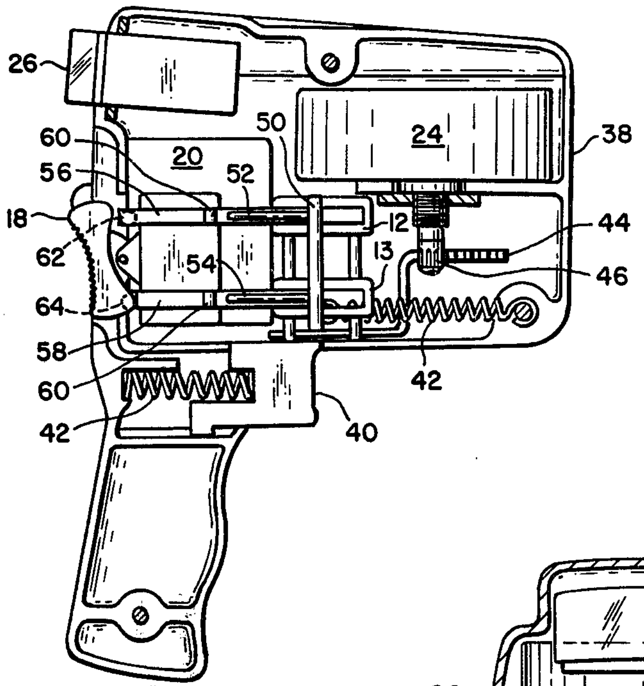
FIG. 2 is a side view of the hand control.
Figure 4:
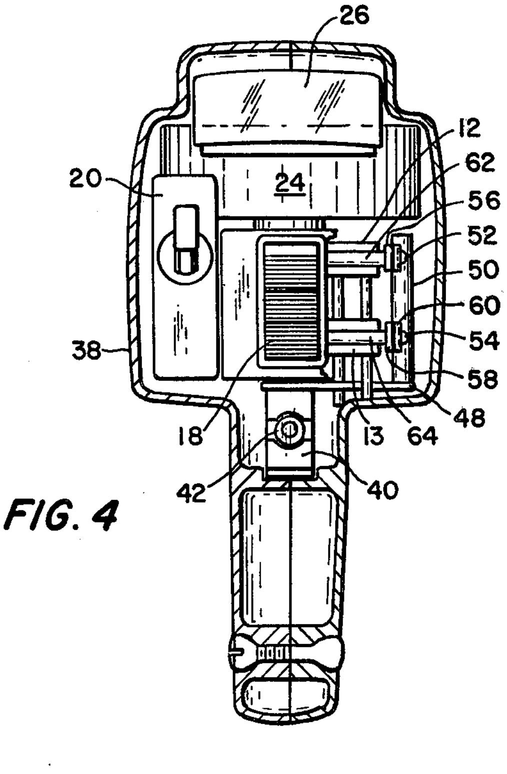
FIG. 4 is a rear view of the hand control.

FIGS. 2, 3 and 4 illustrate the internal arrangement of the various components comprising the hand control. The hand control housing 38 is of a generally rectangular shape incorporating a pistol grip extending from the lower rear portion. The housing may be of any suitable material such as metal or plastic, as for example an aluminum casting or a dielectric plastic injection molding. A trigger 40 is mounted in the housing 38 and is biased by trigger spring 42 toward the fully extended position.

Attached to trigger 40 is a trigger rack 44, which engages a pinion 46, that is formed by splines on the shaft of the variable transformer 24. As used herein the term variable transformer shall be understood to include any variable voltage device in addition to that illustrated, such as a SER AC to DC transformer, or variable firing triac rectifier for example. For small hoists the complete variable transformer 24 may be disposed within the housing 38, as shown. For larger hoists a rectifier or other means for transforming A.C. current to D.C. current may be located remotely from the hand control to function as a D.C. power supply with only the rheostat or current-limiting variable resistor mounted in the hand control to occupy the space designated by the outline of transformer 24. For use with even higher capacity hoists, both the transformer and rheostat functions may be located remotely from the hand control and the volume designated by number 24 may be occupied by a synchro signal generator which sends a voltage signal to a repeater motor that drives the remotely located variable transformer. In any of these arrangements it should be clear that depressing the trigger 40 causes linear translation of the trigger rack 44 which rotates the pinion 46, resulting in increased D.C. current flow to the armature of the hoist motor 28. In those applications where the hoist motor 28 is an A.C. motor, or where D.C. current is available, the control device 24 would be only a rheostat. Any of these arrangements, and combinations thereof, for varying the armature current are satisfactory, the one chosen being a function of a specific hoist and the intended purpose, it being understood that the term variable transformer used herein shall mean to include any of these arrangements.

Referring now specifically to FIG. 4, which is the operator's view of the hand control, the circuit breaker 20 is seen located on the left hand side of the hand control, and the meter 26 is located at the top center portion of the control. The meter 26 reads the D.C. armature current flow of hoist motor 28 (see FIG. 1) by means of a moveable needle which deflects proportionally to current flow, and since the torque developed by motor 28 is directly proportional to armature current the meter 26 is calibrated in payload. Any suitable weight units may be used such as ounces, grams, pounds, kilograms, or tons for example. In some uses it may be preferred to calibrate the meter in torque units such as gram-centimeters, inch-ounces, or foot-pounds for example.

Located at approximately the center of the backside of the hand control is the thumb switch 18. The thumb switch is controlled by a serrated rocking buttom such that depressing the upper portion of the switch button closes the "up" circuit to the hoist motor. Depressing the lower portion of the button rocks the button into the "down" position closing the down circuit to the hoist motor. When the button is in the mid position both circuits are open, and the switch is labelled "off".

Referring again to FIGS. 2 and 3, tension spring 48 is attached to the trigger 40 to function as a backup to the compression trigger spring 42 to assure that the trigger is biased toward the fully extended position. Also attached to trigger 40 is a generally triangular shaped trigger plate 48 which extends from the trigger located on the housing centerline toward the right hand wall of the housing. Mounted vertically at the outermost end of trigger plate 48 is a trigger post 50, which carries two cam actuators 52 and 54 mounted normal to the post 50, one actuator 52 near the top of post 50 and the other actuator 54 near the bottom of post 50. Mounted in a horizontal plane substantially coplaner with each of the cam actuators 52 and 54 are the two circuit switches 12 and 13, and mounted to each of these switches is a spring leaf 56 and 58 respectively, and disposed on each spring leaf is a cam 60.

Figure 5:
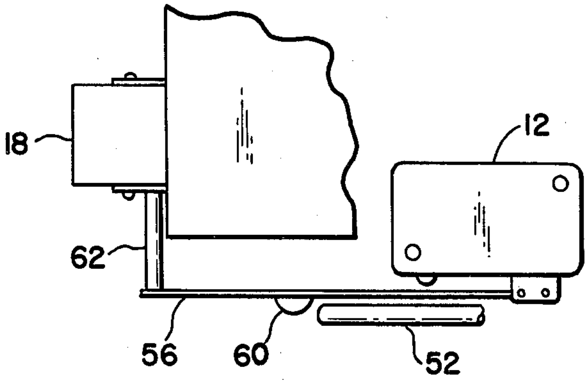
FIG. 5 is a partial view of the hand control device showing the interlock mechanism in detail.

FIG. 5 more clearly shows one of the switches 12 and its associated spring leaf 56 and cam actuator 52. It will be seen that the proximal end of leaf 56 is mounted to circuit switch 12 and at the distal end of leaf 56 is mounted a blocking pin 62. When the trigger 40 is depressed, the cam actuator 52 is moved aft, the initial movement deflecting leaf 56, by means of cam 60, toward circuit switch 12 which closes switch 12. At the same time, the deflection of leaf 56 has moved blocking pin 62 into thumb switch 18. In a like manner switch 13 (FIG. 3) was actuated by the aft movement of cam actuator 54 deflecting switch leaf 58, and blocking pin 64 was moved into thumb switch 18.

Figure 6:
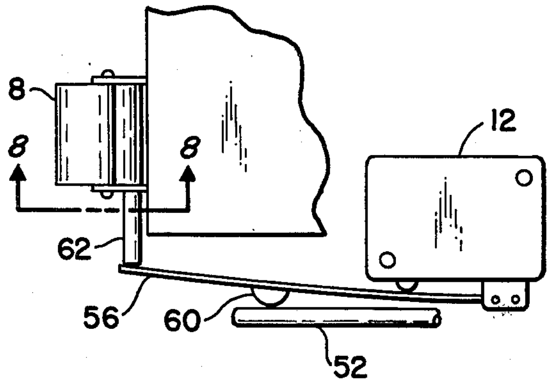
FIG. 6 is a view similar to FIG. 5 wherein the blocking pin is engaged in the thumbswitch.
Figure 8:
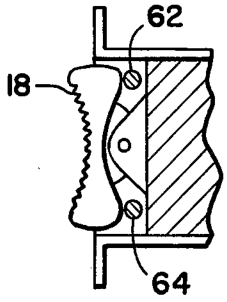
FIG. 8 is a side view of the thumb switch taken from a plane shown by line 8—8 in FIG. 6.

FIGS. 6 and 8 show the blocking pins 62 and 64 engaged in thumb switch 18. It will be noted that thumb switch 18 is in the center or "off" position, thus providing a space for both blocking pins 62 and 64 to enter the thumb switch. In this position the thumb switch cannot be operated to either the "up" or "down" position because of the blocking pins 62 and 64, requiring the trigger to be released so that the blocking pins are extracted from the thumb switch by leafs 56 and 58.

Figure 7:
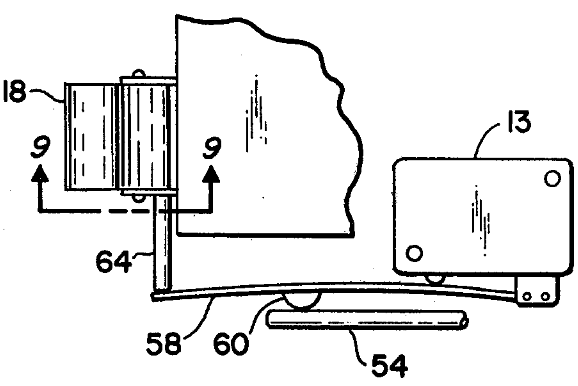
FIG. 7 is a view similar to FIG. 5 wherein the blocking pin has not moved into the thumb switch.
Figure 9:
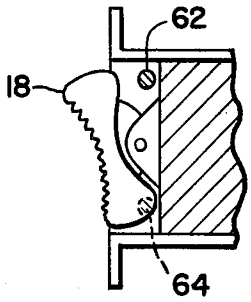
FIG. 9 is a side view of the thumb switch taken from a plane shown by line 9—9 in FIG. 7.

Referring now to FIGS. 7 and 9, it will be seen in FIG. 9 that the thumb switch 18 is in the "down" position, and that the upper blocking pin 62 has entered the thumb switch. However the position of the thumb switch does not provide space for the lower blocking pin 64 to enter the switch. In FIG. 7 it will be seen that the leaf 58 has been deflected by cam actuator 54 and the circuit switch 13 has been actuated, but because blocking pin 64 could not enter thumb switch 18 the leaf 58 has been deformed into a flexed bow. It will be observed that with the trigger depressed in this condition the thumb switch may be moved to the "off" position, but it cannot be continued to the "up" position because of blocking pin 62, and as the thumb switch 18 is moved to the "off" position the flexed leaf 58 will drive the lower blocking pin 64 into the thumb switch. Thus the thumb switch will again be in the condition shown in FIG. 8, and the trigger will have to be released before the thumb switch may be moved to either the "up" or "down" position.

From the foregoing it may be seen that thumb switch 18 may be moved to the center or "off" position at any time, whether or not the trigger is depressed, but it can only be moved to "up" from "down" or "off", or to "down" from "up" or "off", when the trigger is released. In some applications an "off" position may not be required, and therefore a two position switch may be utilized with satisfactory results, the switch being either in the "up" or "down" (or the "forward" or "reverse") position and a blocking pin preventing movement to the other position. However the preferred embodiment provides two assurances that the motor is shut off before the direction of rotation may be reversed, the first being that the thumb switch must pass thru the "off" position on the way to the reversed position, and the second being that circuit switches 12 and 13 must be opened by releasing the trigger before the thumb switch may be moved to a reversed position. The function of circuit switches 12 and 13 may also be performed by the variable transformer 24, if it is constructed to have an "off" position when the shaft of the transformer is rotated to the position concomitant with the fully extended position of the trigger. With such variable transformer embodiment the circuit switches 12 and 13 may be eliminated with satisfactory results, however in the preferred embodiment the variable transformer capability does not reduce to zero current flow, but is adjustable by means of a controllable initial set point to immediately impose a torque on the hoist approximating the payload weight whenever initial trigger movement closes the A.C. circuit which thereby releases the hoist brake 22. This is a safety feature which will not permit the payload to start down during the time that would otherwise be required for the operator to depress the trigger sufficiently to bring the hoist torque up to what is required to hold the payload. This preferred embodiment is primarily applicable to those hoists wherein the gear ratios are such that the hoist is not inherently irreversable and some increment of motor torque is required in addition to gear train resistance to momentarily hold the static payload.

Referring again to FIG. 1, the thumb switch 18 is shown in the off position. Moving the three poles of the thumb switch 18 to the left places the switch in the "up" position, closing those circuits connected to contacts 14, 30, and 34. When the trigger is depressed, circuit switches 12 and 13 are closed, A.C. current flows thru up limit switch 10, thru circuit switch 12, thru contact 14 to circuit breaker 20. From circuit breaker 20 current flows to brake 22, thereby unbraking the hoist, and also current flows from circuit breaker 20 to the variable transformer 24. The amount of D.C. power flowing from transformer 24 is a function of the amount of depression imposed on the hand control trigger 40. Current from the variable transformer 24 flows thru contact 30 to the left side of hoist motor 28, out the right side of motor 28, then back to contact 34 and thru the load meter 26.

Before the three poles may be moved to the right or "down" position the hand control trigger 40 must be released. When the three poles are thereafter moved fully to the right the circuits connected to contacts 16, 32 and 36 are closed. When the trigger is depressed, circuit switches 12 and 13 are closed, A.C. current flows thru down limit switch 11, thru circuit switch 13, thru contact 16 to circuit breaker 20. Current thereafter flows to brake 22 unbraking the hoist, and also current from circuit breaker 20 flows thru the variable transformer 24. D.C. current from the transformer 24 flows thru contact 32 to the right side of motor 28, then out the left side of motor 28, then back to contact 36 and thru the load meter 26.

From the foregoing it may be seen that an improved motor control device has been invented which provides a smoother manner of supplying motor torque and preventing sudden reversals of the motor rotation. This is accomplished by a trigger device which prevents reversing the polarity of the motor circuit until the motor is turned off, a trigger for the operator to indicate how much force is being exerted by the motor, and alternate means for shutting off the motor. Further, it should be clear from the foregoing that the figures and description herein have been drawn to a hoist embodiment, but the invention is not to be limited to the specific arrangement, shape, and number of parts herein set forth, since various modifications may be affected for other motor control requirements without departing from the spirit and scope of the invention.

I claim:

1. An improved electric motor hand control of the type having a trigger for controlling current to a motor proportionally to trigger depression, the improvement comprising:

switching means for setting the rotational direction of said motor; and interlock means for preventing movement of said switching means for setting said rotational direction when said trigger is depressed;

wherein said switching means comprises a three position switch manually movable to a first position for rotating said motor forward, a middle position for turning said motor off, and a third position for rotating said motor in reverse; and wherein said interlock means comprises:

a first spring leaf having a fixed end and a free end;

a first actuator connected to said trigger and disposed adjacent to said first leaf for deflecting said first leaf when said trigger is depressed;

a first blocking pin attached to said first leaf free end and disposed adjacent to said three position switch for blocking movability of said switch to said first position when said first leaf is deflected;

a second spring leaf having a fixed end and a free end;

a second actuator connected to said trigger and disposed adjacent to said second leaf for deflecting said second leaf when said trigger is depressed; and a second blocking pin attached to said second leaf free end and disposed adjacent to said three position switch for blocking movability of said switch to said third position when said second leaf is deflected.

2. The motor control of Claim 1 further comprising:

a first circuit switch disposed adjacent to said first leaf for actuation by the deflection of said first leaf, and a second circuit switch disposed adjacent to said second leaf for actuation by the deflection of said second leaf.

3. An interlock device in a system having a manual control for adjusting the electrical current flow to a motor, said control having an off position, and a switch for reversing the current polarity, said switch manually moveable to a first position and a second position, wherein said interlock device comprises:

a first blocking pin disposed in said switch for locking said switch in said first position; and a first spring leaf attached to said first blocking pin and to said manual control for removing said first blocking pin from said switch when said manual control is in the off position.

4. The interlock device of claim 3, further comprising:

a second blocking pin disposed in said switch for locking said switch in said second position; and a second spring leaf attached to said second blocking pin and to said manual control, for removing said second blocking pin from said switch when said manual control is in the off position.

* * * * *